United States Patent [19]
Jirousek et al.

[11] 3,845,482
[45] Oct. 29, 1974

[54] AUTOMATIC JAMMER

[75] Inventors: John K. Jirousek, Fabius, N.Y.; G. Daniel Hickman, Germantown, Md.

[73] Assignee: The United States of America as represented by the Secretary of the Navy, Washington, D.C.

[22] Filed: Aug. 14, 1970

[21] Appl. No.: 70,611

[52] U.S. Cl. ............................................ 343/18 E
[51] Int. Cl. ............................................. H04k 3/00
[58] Field of Search ................................. 343/18 E

[56] References Cited
UNITED STATES PATENTS

| | | | |
|---|---|---|---|
| 2,953,677 | 9/1960 | Preisman | 343/18 E |
| 2,957,170 | 10/1960 | Haughawout | 343/18 E |
| 3,142,060 | 7/1964 | Goldmark | 343/18 E |

Primary Examiner—Malcolm F. Hubler
Attorney, Agent, or Firm—R. S. Sciascia; L. I. Shrago

[57] ABSTRACT

An electronic jammer is disclosed wherein the frequency of the detected radar pulse is measured at an intermediate frequency level by a sensing arrangement which utilizes a pair of cascaded hybrids with unequal delay lines therebetween. The transmitting and receiving circuits have a common, tunable, local oscillator which is controlled by a discriminating circuit which effectively compares the frequency of the detected pulse with that of the radiated pulse, with any error signal resulting therefrom tuning the common oscillator.

3 Claims, 4 Drawing Figures

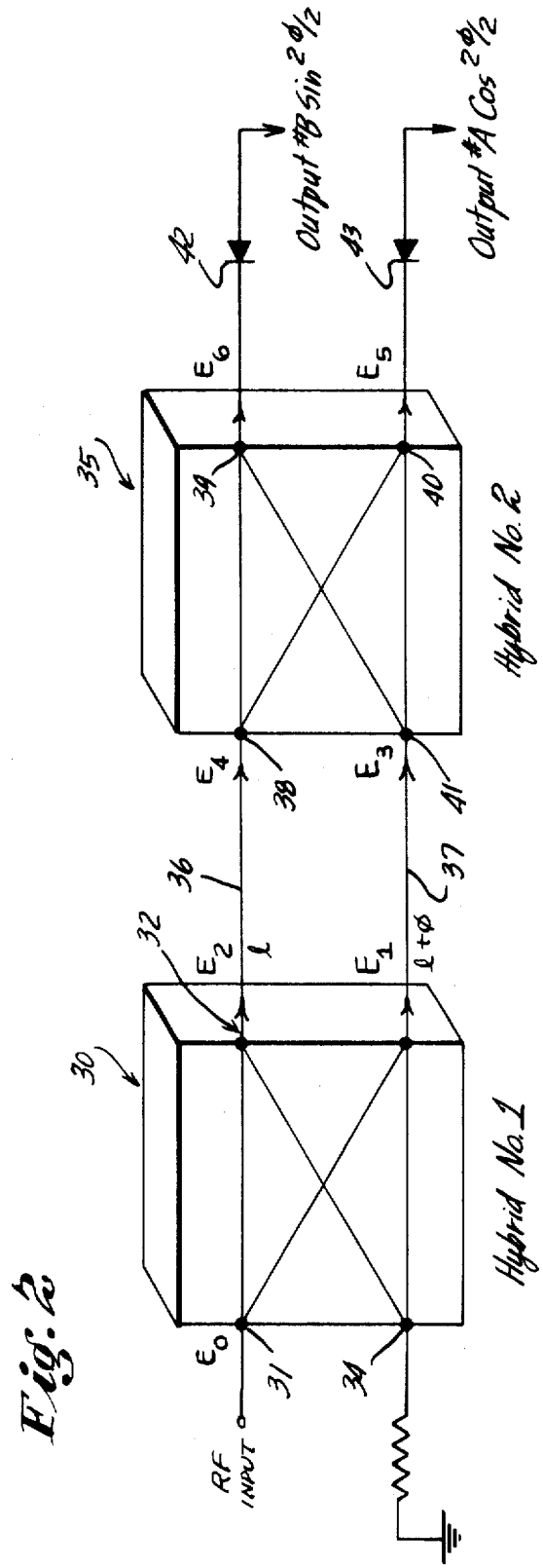

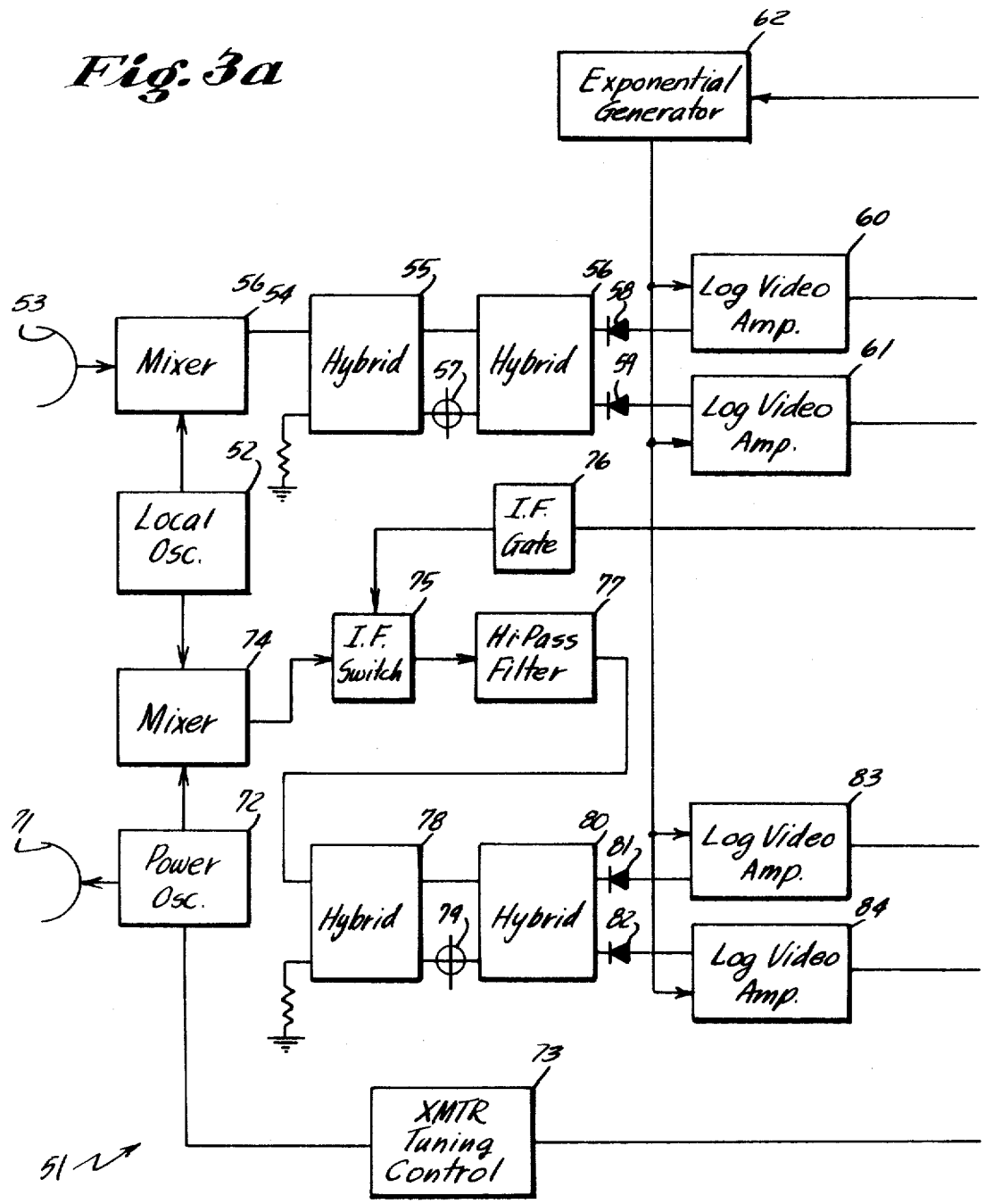

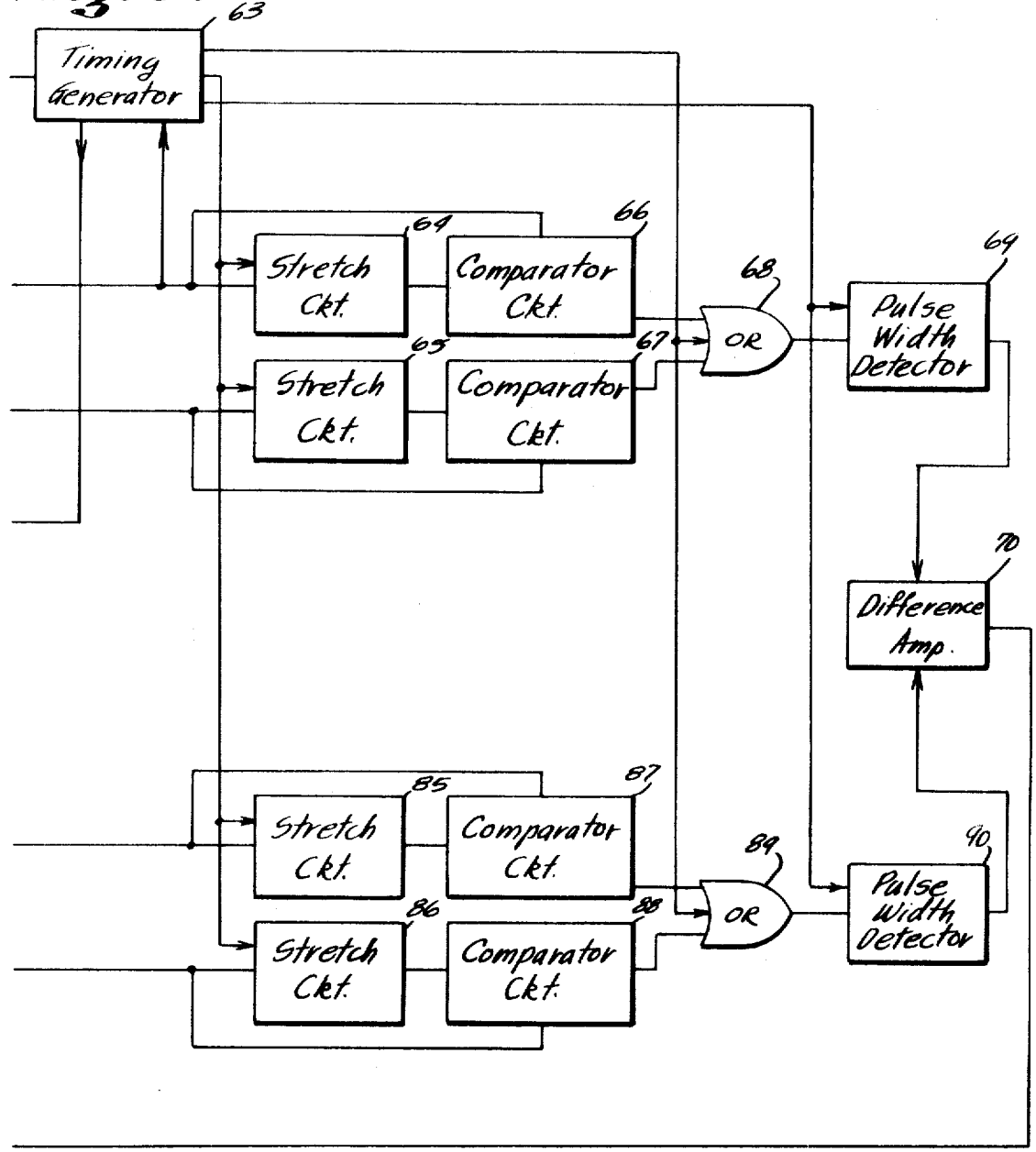

AUTOMATIC JAMMER

The invention described herein may be manufactured and used by or for the Government of the United States of America for governmental purposes without the payment of any royalties thereon or therefor.

The present invention relates generally to electronic countermeasure systems and, more particularly, to a concealment jamming system which employs continuous wave "blanking" to conceal the movement of men and vehicles from radar surveillance.

There are, generally speaking, two basic ECM techniques, namely, deception jamming and concealment jamming. In certain military situations, deception jamming may not effectively counteract the hostile radar since real targets will be seen on this radar as well as the deceptive targets produced by the jammer. Thus, where it is desirable to limit the information which the enemy may obtain from an area rather than cause confusion with false information, concealment jamming may be employed. In concealment jamming, the real targets are effectively masked by cluttering the enemy's radar display by, for example, concentrating sufficient noise energy in the radar receiver's pass-band to raise the radar IF jamming-to-signal ratio to a specified level. The required signal-to-noise ratio depends upon whether the jamming is to cause confusion by producing a significantly high false alarm rate or complete saturation of the receiver.

One type of concealment jamming involves the continuous wave transmission of a signal having a frequency identical to that received from the hostile radar. However, for this technique to be successful and also effectively mask the jammer, the radiated signal must be close in frequency to the radar center frequency. This requirement cannot reasonably be met by manual operation and, consequently, the concealment jammer must include an automatic frequency control system. The use of such automatic frequency control has not, as mentioned hereinbefore, been employed in concealment jammers since these jammers rely primarily on wide band noise or sweeping techniques. Also, although deception jammers have used automatic frequency control, the frequency stability of these systems is only of a few milliseconds and, consequently, circuits for achieving this mode of operation cannot be used in a CW system.

The automatic frequency control systems utilized in some receiving applications are also inappropriate to the ECM situation due to the fact that these frequency control systems operate on the basis of an offset signal. Such an offset signal, although it closely follows changes in the input signal frequency, cannot be effectively utilized in a jammer since the frequency transmitted from the jammer must be identical to that received from the hostile radar.

It is accordingly a primary object of the present invention to provide a concealment jammer which has an automatic frequency control feature.

Another object of the present invention is to provide a concealment jammer wherein a continuous wave having the same frequency as that received from the hostile radar is radiated to mask the movement of men and equipment in a given sector.

Another object of the present invention is to provide an automatic frequency jammer control system capable of tuning to and locking to the identical frequency of the instant radar pulse.

A further object of the present invention is to provide a jammer wherein the frequency of the radiated signal is identical with that of the radar pulse originating from the surveillance radar.

A yet still further object of the present invention is to provide a frequency discriminator in a concealment jammer which employs a pair of hybrids and phase delay lines.

Another object of the present invention is to increase the accuracy of a frequency discriminator employed in a jamming control system which utilizes hybrid couplers as components in the discriminator.

A yet still further object of the present invention is to provide a jammer which has a look-through capability which permits the uninterrupted radiation of a CW signal whose frequency follows variations in the input frequency pulse.

A yet still further object of the present invention is to provide a CW jammer whose operation is completely independent of the width of the input frequency pulse.

Other objects, advantages and novel features of the invention will become apparent from the following detailed description of the invention when considered in conjunction with the accompanying drawings wherein:

FIG. 2 is a schematic diagram of the frequency discriminator used in the signal processing channels; and FIGS. 3a and 3b is a more detailed box diagram of the over-all jammer system.

Figure 1:
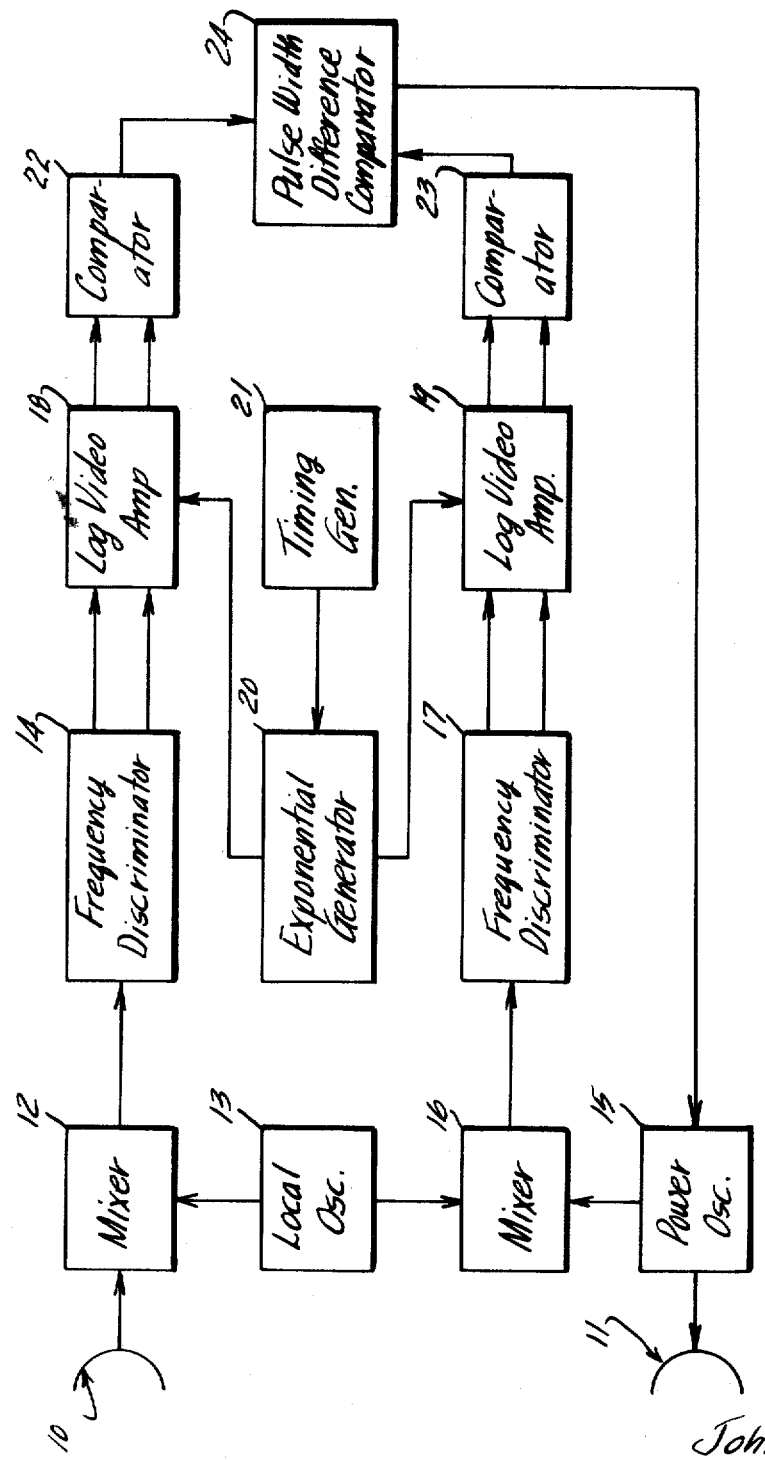
FIG. 1 is a simplified box diagram of the jammer.

Briefly and in somewhat general terms, the above objects of invention are accomplished by utilizing as the frequency sensing apparatus of the jammer two cascaded hybrids with unequal delay $\Phi$ inserted between the two output ports of the first hybrid and the two input ports of the second hybrid. An RF input pulse to this combination yields two voltage outputs which are proportional to $\sin^2\Phi/2$ and $\cos^2\Phi/2$, where $\Phi$ is a function of frequency. An exponential signal from a so-called "log-injection unit" is mixed with these outputs and injected at the inputs to a pair of log video amplifiers. A time gate $\Delta t$ is obtained by stretching the peak amplitudes of these input pulses and comparing them to the exponential signal. The resultant time gate $\Delta t$ is proportional to $ln(\sin^2\Phi(f)/2)/(\cos^2\Phi(f)/2)$, which is a linear function for octave bandwidths. The RF frequency accuracy obtained with this system with a single pulse is approximately 1 to 2 percent of the hybrid bandwidth.

Although the above-mentioned technique for obtaining the RF frequency of a single pulse is both simple in concept and cheap to implement, the resultant frequency accuracy is somewhat limited. Thus, in order to obtain the RF frequency with the accuracy needed for the jammer, the signals fed to the frequency discriminator, that is, the cascaded hybrids, are at an intermediate frequency rather than the radio frequencies of the detected radar pulse. The absolute frequency indeterminacy is therefore reduced since smaller bandwidth hybrids may be used with these signals.

The over-all jammer system consists of two separate channels, a received path and a transmit path with a common, tunable local oscillator. Each channel utilizes a frequency discriminator log injection unit which operates as previously described. The received channel, however, processes pulse signals exclusively, whereas the transmit channels operates CW in the mixer and preamplifier portion thereof. A switching circuit is subsequently utilized in this channel to generate a pulse signal for the frequency discriminator circuit.

The width of the pulses which appear at the outputs of the received and transmit channels are proportional to the absolute frequencies of the pulses applied to these channels. Each variable width pulse is fed to a pulse width detector circuit which produces a DC voltage output the amplitude of which is proportional to the width of its input pulse. These DC voltages are applied to a difference amplifier which, in turn, controls the frequency of the transmitter oscillator.

Referring now to FIG. 1 which is a simplified box diagram of one embodiment of the present invention, it will be seen that the over-all jammer includes a directional input antenna 10 for receiving radar pulses from the hostile radar and a directional output antenna 11 suitably spaced therefrom for radiating the CW jamming signal back towards the hostile radar. The radio frequency signal from antenna 10 is fed to a mixer 12 which has as its other input a signal from local oscillator 13. The intermediate frequency signal appearing in the output of this mixer is sent to a frequency discriminator 14 of the type previously described in general terms.

Output antenna 11 is driven by a power oscillator 15 tuned by the automatic frequency control provision of the jammer so that the radiated CW signal has a frequency equal to that of the radar pulses detected by input antenna 10. The output of oscillator 15 is also fed to a second mixer 16 which, like mixer 12 in the receiving channel of the jammer, has as its second input a signal from local oscillator 13. The intermediate frequency signal appearing in the output of mixer 16 is likewise sent to a frequency discriminator 17 in the transmitting channel which is similar to its counterpart 14 in the receiving channel.

As will be seen hereinafter, the output of each frequency discriminator is a pair of pulses, and the ratio of their respective logarithmic amplitudes is proportional to the frequency of the RF input signal. These pairs of pulses are therefore supplied to log video amplifiers 18 and 19 which have as additional inputs an exponential signal produced by generator 20. This generator is periodically activated by a timing source 21 so as to produce an exponential wave form, for example, once each time interval between successive radar pulses or multiples thereof.

The output of log video amplifier 18, which consists of a linearly decreasing ramp pulse obtained from the exponential signal followed by two variable amplitude pulses obtained from discriminator 14, is fed to a comparator circuit 22 which generates a pulse whose width is proportional to the ratio of the amplitude of the two pulses. Likewise, the output of log video amplifier 19 is fed to a comparator 23 in the transmitting channel which operates in a similar fashion to generate a second pulse of variable width. It will be appreciated that the width of the pulse appearing in the output of comparator 22 is proportional to the frequency of the RF radar pulse and the width of the pulse appearing in the output of comparator 23 is proportional to the frequency of the radiated CW signal. The output of both comparators are fed to a pulse width difference comparator 24, and the signal appearing in its output circuit, which is proportional to the frequency mismatch between the previously mentioned signals, is employed to correct the frequency of power oscillator 15.

The operation of the frequency discriminator portion of the jammer can best be understood by referring now to FIG. 2 which shows a first hybrid coupler 30 having input terminal 31 and output terminals 32, 33 and 34 interconnected to a second hybrid coupler 35 by means of delay lines 36 and 37 of unequal length. Delay line 37 is longer than delay line 36 by an amount $\Phi_0$. Hybrid coupler 35 has the usual four terminals 38, 39, 40 and 41.

In analyzing the operation of the above circuit, let the input pulse obtained from antenna 10 be $E_o$. This signal is applied to terminal 31. Then, in the case where hybrid coupler 30 is a 90° hybrid, the voltage at output terminal 33 may be expressed as $$E_1 = [1/\sqrt{2}] E_o e^{-j\pi/2}$$

(1)

Likewise, $E_2$, the voltage appearing at output terminal 32 may be expressed as $$E_2 = [1/\sqrt{2}] E_o$$

(2)

Terminal 34, as is well known, is terminated in an appropriate matching impedance. Since delay line 37 is longer than delay line 36 by an amount $\Phi$, the signal $E_4$ applied to terminal 38 and the signal $E_3$ applied to terminal 41 may be expressed as follows:

$$E_4 = 1/\sqrt{2}\, E_o$$

(3)

$$E_3 = [1/\sqrt{2}] E_o e^{-j\pi/2} \cdot e^{-j\Phi(f)} = [1/\sqrt{2}] E_o e^{-j(\Phi(f) + \pi/2)}$$

(4)

where $\Phi$ is a function of the frequency of the RF signal. The values of $E_5$ and $E_6$ appearing at terminals 39 and 40, respectively, of the second hybrid 35 may be obtained as composite values of $E_3$ and $E_4$ $$E_5 = [1/\sqrt{2}] E_3 + [1/\sqrt{2}] E_4 e^{-j\pi/2} = 0.5 E_o [1 + e^{-j\Phi(f)}] e^{-j\pi/2}$$

(5)

$$E_6 = [1/\sqrt{2}] E_4 + [1/\sqrt{2}] E_3 e^{-j\pi/2} = 0.5 E_o [1 - e^{-j\Phi(f)}]$$

(6)

The output of detectors 42 and 45, $P_5$ and $P_6$, may be expressed as follows:

$$P_5 = E_5 E_5^* = [E_o/2]^2 \cdot [1 + e^{-j\Phi(f)}] \cdot e^{-j\pi/2} [1 + e^{j\Phi(f)}] \cdot e^{-j\pi/2}$$

(7)

$$P_6 = E_6 E_6^* = [E_o/2]^2 \cdot [1 - e^{-j\Phi(f)}][1 - e^{j\Phi(f)}]$$

(8)

where $E_5$ and $E_6$ are complex conjugate voltages. Expressions 9 and 10 reduces to $$P_5 = E_o^2 \cos^2[\Phi(f)/2] \quad (9)$$

$$P_6 = E_o^2 \sin^2[\Phi(f)/2] \quad (10)$$

Consider now the following relationships:

$$\ln P_6/P_5 = \ln[\sin^2(\Phi_{(f/2)}/\cos^2(\Phi_{(f/2)}] = \ln \tan^2[\Phi_{(f)}/2] \quad (11)$$

and $$\ln P_5/P_6 = \ln[\cos^2(\Phi_{(f/2)}/\sin^2(\Phi_{(f/2)}] = \ln \cot^2[\Phi_{(f)}/2] \quad (12)$$

It can be shown that if the longer delay line 37 exceeds the shorter delay line 36 by an amount $\Phi_o$, and if this difference is a quarter wave length of the radar signal frequency, then, over an active band centered about this frequency the change in electrical length of this delay line section, $\Phi_f$, due to a change in the radar frequency when plotted against expressions (11) and (12), produced approximately two straight lines from the 30° to 60° values. These straight lines start from the 45° point and have the same slope but opposite sign. This linear relationship, where it exists, means that equations (12) and (13) may be utilized to obtain an indication of the frequency of the incoming radar pulse over an appropriate octave band.

Referring now to FIG. 3 which is a box diagram of the complete jammer, it will be seen that the system consists of two separate signal processing channels, a receiving channel 50 and a transmitting channel 51, with both sharing a common, tunable, local oscillator 52. The radar signal detected by input antenna 53 is fed to a mixer 54 which has as its other input a signal from local oscillator 52. The intermediate frequency signal which is produced by this mixing operation and which permits smaller bandwidth hybrids to be used in the system is fed to cascaded hybrids 55 and 56 in the manner more particularly shown in FIG. 2. The unequal delay line section associated with these hybrids is shown by the schematic representation 57. The two outputs of hybrid 56, voltages $E_5$ and $E_6$, are supplied to detectors 58 and 59, producing the quantities $P_5$ and $P_6$ of expressions (7) and (8).

The output of these detectors is applied to a pair of log video amplifiers 60 and 61 which have as additional inputs signals produced by exponential generator 62. This exponential generator is periodically activated by a timing generator 63 so that an exponential signal of decreasing amplitude is fed to each log video amplifier for every radar pulse arriving at input antenna 53. This mode of operation permits the frequency of the radiated CW signal to be corrected on a pulse-to-pulse basis. However, it should be appreciated that for a less critical type of operation, timing generator 63 may operate to produce an exponential signal only once for a given multiplicity of radar pulses.

Log video amplifiers 60 and 61 produce the quantities $\log P_5$ and $\log P_6$ from the signals of expressions (9) and (10) and produce from the exponential signal a linearly decreasing ramp pulse for use later on in the system as a timing wave form. Log video amplifiers are supplied to a pair of stretch circuits 64 and 65. These stretch circuits, which may be box car circuits, prolong the $\log P_6$ and $P_5$ signals while maintaining their peak amplitudes. The width of the pulse signals present in the receiving channel up to this point corresponds to that of the radar pulse. The stretching circuits facilitate a determination of the amplitudes ratio of the signals $\log P_5$ and $\log P_6$ and the translation of this ratio into a corresponding variable width pulse signal for subsequent use in the automatic frequency control portion of the system.

Stretch circuits 64 and 65 are coupled to comparator circuits 66 and 67 for the above purpose. These comparator circuits also have the linearly decreasing ramp signals as their other inputs, and they operate, in the particular case shown, to define the trailing edge of an output pulse when the amplitude of the ramp equals the amplitude of the stretched pulse. The leading edge of this output pulse may be formed by the timing generator triggering a suitable pulse generating circuit. Thus, for example, in the case of comparator circuit 66, the occurrence of this equality defines the terminal edge T1 and in the case of comparator circuit 67, terminal edge T2. An exclusive OR gate 68 having its inputs coupled to these comparator circuits generates a rectangular pulse whose time duration $\Delta T$ is established by the time difference between $T_1$ and $T_2$. From a different point of view, the exclusive OR circuit 68 generates a pulse whose width, $\Delta T$, is proportional to the time the ramp pulse takes to pass from the amplitude of the higher amplitude stretched pulse to the amplitude of the lower amplitude stretched pulse. Thus, in effect, the comparator circuits 66, 67 and the exclusive OR circuit 68 cooperate to form an output pulse of time duration $\Delta T$ which is proportional to the amplitude ratio of $\ln \tan^2 \Phi_{f}/2$ or $\ln \cot^2 \Phi_{f}/2$, expressions (11) and (12) previously described. The output of exclusive OR circuit 68 is supplied to a pulse width detector 69 which converts pulse width to pulse amplitude, and the variable amplitude signal resulting therefrom is fed to a difference amplifier 70. This difference amplifier, as will be seen hereinafter, has another signal fed thereto whose amplitude is proportional to the frequency of the CW signal radiated by the output antenna of the jammer. Thus, difference amplifier 70 is the circuit which makes the comparison between the radio frequency signal detected from the hostile radar and the radio frequency signal radiated to jam this radar.

Up to this point in the description, we have dealt solely with the receiving channel and the manner in which it processes the radio frequency radar pulse received from the hostile radar to determine its frequency and generate a variable amplitude pulse proportional to this frequency.

The transmitting channel 51 of the jammer is similar in most respects to the receiving channel 50 except that it includes a provision for sampling the radiated CW signal so as to provide a pulse signal to the frequency discriminator. This duplicates the pulse signal being treated in the receiving channel. Output antenna 71 is driven by a power oscillator 72 whose frequency is varied by tuning control circuit 73. Oscillator 72 also feeds a mixer 74 which has as its other input a signal from local oscillator 52. The intermediate frequency produced in the output of mixer 74 is fed to an IF switch 75 which is periodically opened by an IF gate 76 under the control of timing generator 63. Thus, when timing generator 63 triggers IF gate 76, this gate opens IF switch 75 for a predetermined time interval, slightly longer, for example, than the radar pulse width. The resultant pulse appearing in the output of IF switch 75 is fed to a high pass filter 77 and then to the input of the first hybrid 78 of the frequency discriminating circuit. The unequal delay portion 79 is associated with the second hybrid 80. From here on, the transmitting channel and circuits are the same as the receiving channel. Thus, detectors 81 and 82 are connected to hybrid 80. Log video amplifiers 83 and 84, stretch circuits 85 and 86, comparator circuits 87 and 88, the exclusive OR circuit 89, and the pulse width detector 90, whose output provides the other input to difference amplifier 70, follow in that order. The output of difference amplifier 70 is the error signal in the system which controls tuning circuit 73 for varying the frequency of power oscillator 72 and the radiated CW jamming signal.

In the system of FIG. 3, some of the individual circuits have to be reset after each cycle of operation and the necessary resetting pulses may be derived from timing generator 63. For example, a delayed timing pulse from this generator may be sent to all of the stretch circuits 64, 65, 85 and 86, the exclusive OR circuits 68 and 89, and the pulse width detector circuits 69 and 90. Likewise, the setting of timing generator 63 may be adjusted so as to ensure that the exponential signal produced by generator 62 occurs in advance of the detected radar pulses. Any suitable manual control can be used to establish the operating time of this timing generator and, since the pulse repetition rate of the hostile generator will remain substantially fixed once the above relationship is established, it will not have to be altered. Any video instrument can be included in the system before the stretch circuits to insure the proper appearance of the exponential signal. It will also be appreciated that the ramp signal will be effectively destroyed as it passes through the stretching circuits. Consequently, a suitable bypass circuit is included in the system for allowing the ramp pulses to pass directly into the comparator circuits.

What is claimed is:

1. Apparatus for jamming a remote radar which is periodically transmitting radio frequency pulses comprising, in combination, means for receiving said radio frequency pulses;

means for transmitting toward said remote radar a C.W. radio frequency signal;

a local oscillator;

means for mixing said received radio frequency pulses and a portion of said radio frequency signal with said local oscillator so as to produce IF pulses and an IF signal;

a pair of cascaded hybrid couplers having unequal length delay lines connected between the two outputs of each first coupler and the two inputs of each second coupler of said pair;

means for feeding said IF pulses to the input of the first coupler of one pair and a pulse length portion of said IF signal to the input of the first coupler of the other pair;

a detector connected in each output of the second coupler of said pair, whereby the ratio of the logarithmic amplitudes of the pairs of video pulses developed by the two detectors of each second coupler is proportional to the frequencies of said IF pulse and said IF signal;

means for converting each pair of video pulses to a single pulse whose width is proportional to said ratio;

means for comparing the widths of these single pulses and for producing an output pulse whose amplitude corresponds to the difference between these pulse widths, said amplitude being proportional to the difference in frequency between said IF pulses and said IF signal; and means controlled by said output pulse for changing the frequency of the C.W. radio frequency signal transmitted towards said remote radar so that the widths of the single pulses are equalized and the frequency of the C.W. radio frequency signal consequently matches that of the received radio frequency pulses.

2. In an arrangement as defined in claim 1, wherein the inequality in the length of the delay lines connected between the cascaded couplers of each pair corresponds to one quarter wave length of the center frequency of the radio frequency pulses transmitted from said remote radar.

3. In an arrangement as defined in claim 1, wherein said means for converting each pair of video pulses to a single pulse includes a logarithmic amplifier connected to each detector;

means for periodically generating a timing signal which has a linearly decreasing amplitude; and means for comparing the amplitudes of the pulses appearing in the output of each pair of logarithmic amplifiers with the amplitude of said timing signal and for producing a single pulse whose duration corresponds to the time required for said timing signal to change from a first value corresponding to the amplitude of the video pulse in the output of one video amplifier to a second value corresponding to the amplitude of the video pulse in the output of the other video amplifier of said pair.

* * * * *